March 31, 1970  D. SCHMIDT  3,503,208

CO₂ GAS TURBINE POWER PLANT

Filed July 29, 1968  2 Sheets-Sheet 1

Inventor:
David Schmidt
BY
ATTORNEYS

March 31, 1970  D. SCHMIDT  3,503,208
CO₂ GAS TURBINE POWER PLANT
Filed July 29, 1968  2 Sheets-Sheet 2

Inventor:
David Schmidt
BY Pennie, Edmonds,
Morton, Taylor and Adams
ATTORNEYS

United States Patent Office 3,503,208
Patented Mar. 31, 1970

3,503,208
CO₂ GAS TURBINE POWER PLANT
David Schmidt, Zurich, Switzerland, assignor to Sulzer Brothers Limited, Winterthur, Switzerland, a Swiss company
Filed July 29, 1968, Ser. No. 748,564
Claims priority, application Switzerland, July 27, 1967, 10,678/67
Int. Cl. F01k 7/20, 9/00, 25/00
U.S. Cl. 60—36                        6 Claims

ABSTRACT OF THE DISCLOSURE

There is disclosed a closed cycle gas turbine power plant in which $CO_2$ flows as the working substance through a high pressure turbine, a heat source, a low pressure turbine, a low pressure compressor coupled to the low pressure turbine, an intermediate pressure compressor and (at least in part) a high pressure compressor both coupled to the high pressure turbine. A line is provided connecting the output of the high pressure compressor with a point of low pressure in the cycle, and means responsive to the pressure ratios of the separate compressors are provided to control flow of $CO_2$ through this line. A valve is provided at the inlet to the low pressure turbine, and a bypass having a valve therein is provided around the low pressure turbine. These valves are coupled for adjustment in opposite senses in response to speed or acceleration values of the low pressure turbine. Provision is also made to inject cooled, compressed or condensed $CO_2$ into the bypass in an amount varying directly with the temperature at the downstream end of the bypass. A relay is also provided to open the bypass in the event of loss of the load, which is coupled to the low pressure turbine.

---

The present invention pertains to a gas turbine power plant employing $CO_2$ as a working substance and a nuclear reactor or other suitable heat source, the plant including at least two stages of compression with intercooling between them and at least two expansion stages with heating of the working substance between those expansion stages, and also a regenerator, the useful load output being taken from the low pressure expansion stage and the supply of heat being effected at least in part to partially expanded working substance, the plant further including a bypass line having a control valve therein which couples the outlet of the high pressure compressor with a point of minimum pressure.

It is an object of the invention to protect the plant against run away speed, in the event of sudden removal of the load. It is a further object of the invention to improve the speed regulation of the useful load output shaft so as to stabilize the frequency of alternating current electric energy developed in an electric generator on that shaft. Further, in embodiments of the invention employing a nuclear reactor as a heat source, it is an object of the invention to protect the plant against excessive temperatures in the event of sudden reduction in the load.

In accordance with the invention an adjustable throttling device is inserted in the main flow path for the working substance upstream of the low pressure expansion stage and a bypass line including a flow control device is provided around this stage. Advantageously, the throttling and flow control devices are adjusted in response to a speed or acceleration measurement device coupled to the low pressure shaft, the adjustment of these devices being so effected that the combined throughput of gas through the low pressure turbine and its bypass remains substantially constant.

In order to reduce the temperature of gas flowing through the bypass line, working substance of lower temperature can be injected into that line for protection of the regenerator or regenerators.

If partial condensation of the working substance is effected at high pressure, the reduction in the temperature of the gas in the bypass can be effected by injection of condensate into that bypass line. To this end, a line or conduit may be provided leading from the condenser output into the bypass.

A particularly quick response to a sudden decline in load at the generator will be achieved if the flow control device in the bypass line is operated by the load loss relay on the generator. To prevent surging of the compressors and run away speed of the high pressure turbine, the regulating valve in the line from the high pressure compressor to the point of minimum pressure may be operated by a threshold controller receiving signals from a tachometer on the high pressure shaft or from pressure measuring devices in the separate compressors.

BRIEF DESCRIPTION OF THE DRAWINGS

The invention will now be further described in terms of a number of non-limitative exemplary embodiments and with reference to the accompanying drawings in which.

Figure 1:
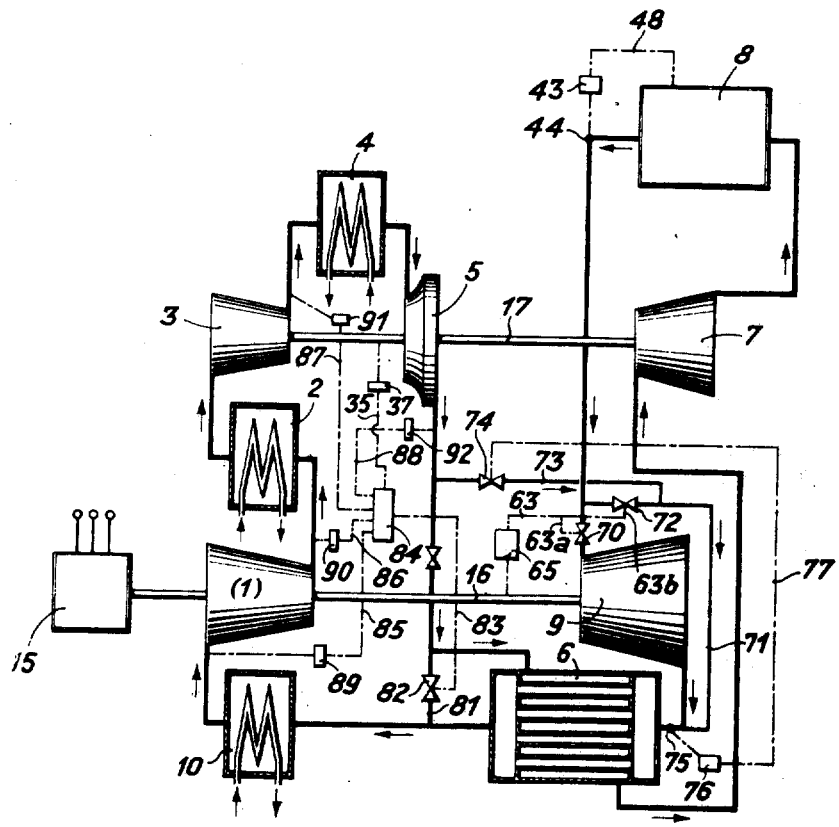
FIG. 1 is a diagrammatic representation of a first form of power plant according to the invention, without partial condensation.

In the drawing, "lines" or pipes (i.e. conduits) carrying gaseous $CO_2$ are shown as single lines on the paper. Conduits carrying condensate are shown as dashed lines, while signal conduits are shown as dot-dash lines.

In the embodiments of both figures, the low pressure compressor 1 draws cold expanded gas from the return cooler 10 and raises it to an intermediate pressure. The low pressure compressor 1 and the useful load generator 15 are disposed on the low pressure shaft 16 driven by the low pressure turbine 9. From the compressor 1 the gas passes through an intercooler 2 to the intermediate level compressor 3 on the shaft 17 of the high pressure turbine 7. From the compressor 3 the gas flow through an intercooler 4 to the high pressure compressor 5 and thence to the right in the figure through a heat recovery unit or regenerator 6 where it is raised in temperature by expanded gas flowing to the left from the turbine 9. The compressed gas so flowing to the right through the heat recovery unit 6 passes thence to the turbine 7. The $CO_2$ emerging from the turbine 7 is raised in temperature by passage through a nuclear reactor 8 whereafter it is expanded to starting pressure in the turbine 9. The expanded gas then returns to its initial condition by flowing to the left in the figure through the recovery unit 6 and the cooler 10. In the element 10 as in the intercoolers 2 and 4, heat s rejected from the system with the aid of a coolant such as water.

In accordance with the invention an adjustable throttling device 70 is inserted into the main flow path of the working substance immediately upstream of the turbine 9. A bypass line 71 including an adjustable flow control device 72 and extending about the turbine 9 connects into the main flow path upstream of the throttling element 70. Flow through the line 71 is controlled by the device 72. A further line 73 opens into the bypass 71 downstream of the valve 72, the line 73 connecting the outlet of the high pressure compressor 5 with the bypass 71. Through the line 73 relatively cold gas can be injected into the bypass. The amount of gas flowing through the line 73 is controlled by the valve 74. The valves 70 and 72 are adjusted as a function of the speed of the shaft 16 as measured in a tachometer 65 having an output signal line 63 whose branches 63a and 63b connect to the valves 70 and 72. These valves, like the valves or flow control devices 74 and 82, include actuators capable of responding to signals to change the resistance to flow therethrough. The tachometer 65 may however be replaced by an acceleration measurement device. Advantageously the valves 70 and 72 are adjusted in opposite senses so that the flow-through capacity of the turbine 9 and line 71 together is held substantially constant. In this way, the danger of surging action in the low pressure compressor 1 is substantially reduced.

To protect the regenerator 6 from hot gas which can sometimes flow through the line 71, a temperature measurement device 75 is provided at the inlet to the regenerator 6 for gas flowing toward it from the turbine 9 and the line 71. Device 75 supplies a signal to a controller 76 which via signal line 77 adjusts the valve 74 so as to control the amount of cold gas injected into the bypass 71.

Figure 2:
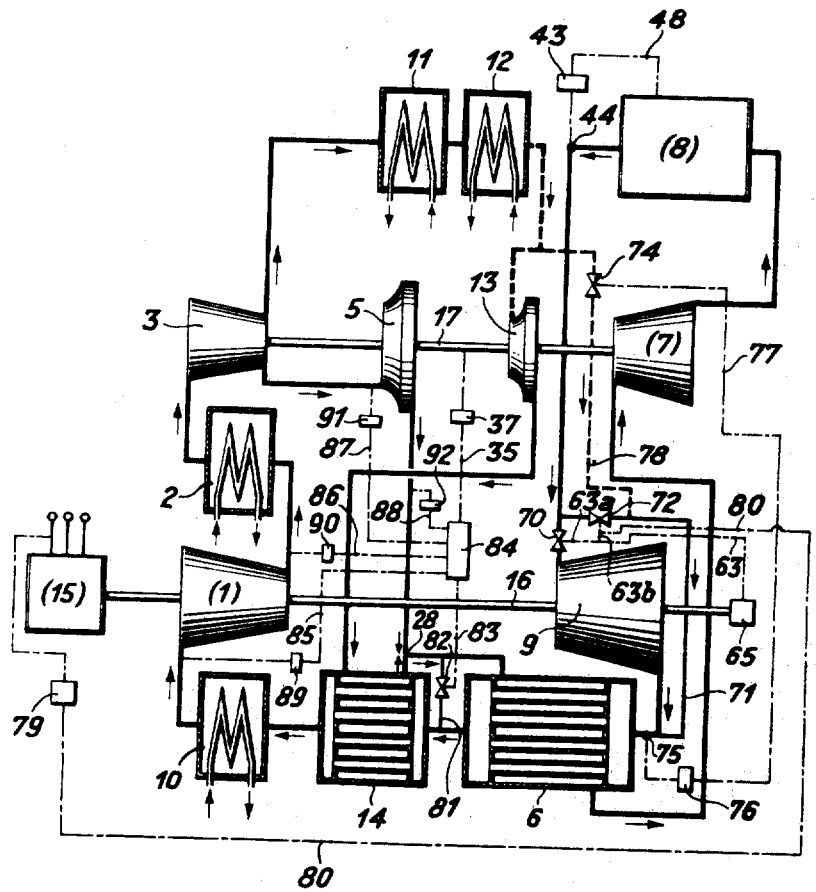
FIG. 2 is a diagrammatic representation of another form of plant according to the invention in which part of the $CO_2$ working substance is condensed.

In the plant of FIG. 2 wherein the working substance undergoes partial liquefaction at high pressure, the intercooler 4 of FIG. 1 is dispensed with. Instead the main flow path for the working substance is divided into two branches at the outlet of the compressor 3. One of the two approximately equal streams into which the working substance is thus divided flows through the pre-cooler 11 and condenser 12 to a pump 13 where it is raised to the final pressure of the plant. The flow circuit is advantageously so dimensioned that the condensate emerging from the condenser 12 is raised in the pump 13 through its critical pressure, whereafter it is heated in the regenerator 14 (flowing to the right therein) by means of spent gas flowing to the left therethrough. The high pressure gas thus emerging from the unit 14 is rejoined at the junction point 28 with the other stream of the working substance and thence flows to the right through the regenerator 6 before being delivered to the high pressure turbine 7. The other stream of the working substance flows from the compressor 3 to the high pressure compressor 5 where it is raised to final pressure and delivered to the junction point 28.

Heat is extracted from the system in the coolers 2, 10 and 11 and in the condenser 12.

In FIG. 2 the line 73 of FIG. 1 is replaced by a line 78 through which, instead of the cold high pressure gas delivered by compressor 5, there flows condensate to be injected and vaporized into line 71 and thereby to cool the $CO_2$ flowing through line 71. This condensate comes through line 78 from the junction of the latter with the line between the condenser 12 and pump 13.

In order that the valve 72 may promptly change its setting in the event of a sudden decline in load, this valve is subjected in FIG. 2 to the action of a load loss relay 79 via a signal line 80. The relay 79 thus acts as a limit relay. In the event of a sudden removal of the load on the generator 15, this relay effects opening of the valve 72 even before response can occur from the tachometer or accelerometer 65.

In both embodiments a bypass line 81 is provided between the outlet of the compressor 5 (or in FIG. 2 between a point downstream of the junction 28) and a point of minimum pressure. The line 81 includes a control valve 82 which is adjusted via a signal line 83 in response to the output of a limit controller 84 which responds to pressures measured at the devices 89 to 92 and which are connected to the regulator 84 via signal lines 85 to 88. A further input to the regulator 84 is provided by the high pressure shaft tachometer 37 which connects to the regulator 84 via a signal line 35. In order to prevent the ratio of output pressure to input pressure at either of the compressors 3 and 5 from exceeding a desired limit and thereby in order to prevent surging action by these compressors, signals representative of these ratios are derived in the regulator 84 from the pressure measurement signals delivered to it. As soon as one of these pressure ratios exceeds the limit specified therefor, the controller 84 will open the valve 82 in the line 81 so that a portion of the working substance will flow from the high pressure part of the plant to a point of lowest pressure therein.

If however the speed of the shaft 17 exceeds the limiting value therefor prior to transgression by either of the pressure ratios of its respective limit, the tachometer 37 will actuate the regulator 84. Control via the valve 82 in the line 81 is thus a limit control, preventing surging at the compressors 1, 3 and 5, and run away speed of the high pressure shaft.

To protect the reactor 8 against excessive temperatures, the temperature of the gas emerging from the reactor 8 is adjusted by action of the controller 43 in response to a temperature-representative signal developed at the temperature measuring device 44, the controller 44 operating via a signal line 48 on the reactor itself, for example on the control rods thereof. This control may be either one which holds the temperature of the $CO_2$ emerging from the reactor on one side of a limit, or it may hold that temperature to a fixed value, preventing departures in either direction therefrom.

While the invention has been described hereinabove in terms of presently preferred embodiments thereof, the invention itself is not limited thereto, but rather comprehends all modifications of and departures from those embodiments properly falling within the spirit and scope of the appended claims.

I claim:

1. A closed cycle $CO_2$ gas turbine power plant including a high pressure turbine, a heat source, a first valve, a low pressure turbine coupled to a load, a low pressure compressor coupled to the low pressure turbine, an intercooler, and intermediate and high pressure compressors coupled to the high pressure turbine all connected together in a closed cycle for flow of $CO_2$ gas therethrough, a first bypass line connecting the outlet of the high pressure compressor with a point in the cycle between the low pressure turbine and low pressure compressor, and a second bypass line having a second valve therein connected around said first valve and the low pressure turbine.

2. A power plant according to claim 1 including means to adjust said first and second valves in opposite senses in response to a time derivative of the motion of said low pressure turbine.

3. A power plant according to claim 1 including means to inject into said second bypass line $CO_2$ taken from a point of lower temperature in the cycle.

4. A power plant according to claim 2 further including a load loss relay, and means to open said second valve responsive to actuation of said load loss relay.

5. A power plant according to claim 1 including a condenser and pump connected in series with each other and in parallel with said high pressure compressor, and conduit means connecting the outlet of the condenser with said second bypass line.

6. A power plant according to claim 1 including a valve in said first bypass line, means to measure the ratio of the pressures across at least one of said separate compressors, and means to open said last-named valve in response to values of said ratio in excess of a limit.

References Cited

UNITED STATES PATENTS

| | | | |
|---|---|---|---|
| 2,203,731 | 6/1940 | Keller. | |
| 2,318,905 | 5/1943 | Traupel | 60—39.25 XR |
| 2,627,717 | 2/1953 | Waller | 60—39.25 XR |
| 2,697,492, | 12/1954 | Destival | 60—39.25 XR |
| 3,321,930 | 5/1967 | La Fleur | 60—59 XR |

MARTIN P. SCHWADRON, Primary Examiner
ROBERT R. BUNEVICH, Assistant Examiner

U.S. Cl. X.R.

60—59